UNITED STATES PATENT OFFICE.

GADIENT ENGI, OF BASEL, SWITZERLAND, ASSIGNOR TO SOCIETY OF CHEMICAL INDUSTRY IN BASLE, OF BASEL, SWITZERLAND.

MONO-BROM-TRICHLOR INDIGO AND PROCESS OF MAKING SAME.

No. 915,338. Specification of Letters Patent. Patented March 16, 1909.

Application filed September 17, 1908. Serial No. 453,512.

*To all whom it may concern:*

Be it known that I, GADIENT ENGI, a citizen of the Swiss Republic, and resident of Basel, Switzerland, have invented a new and useful Mono-Brom-Trichlor Indigo and a Process of Making the Same, of which the following is a full, clear, and exact specification.

In my United States Letters Patent No. 872,115, dated November 26, 1907, I have described a process for the manufacture of mixed chlor-brom derivatives of indigo consisting in treating mono and dichlor derivatives of indigo with bromin in presence of a suitable indifferent diluent or solvent. I have now found, that in an analogous manner, a new monobrom-trichlor derivative of indigo can be obtained by brominating the trichlor indigo described in my application for United States Letters Patent Ser. No. 428,243, dated April 20, 1908, and which results by treating indigo suspended in nitrobenzene with chlorin in presence of an antimony chlorid. Relatively to its chemical and tinctorial behavior this new monobrom-trichlor indigo shows a great resemblance to tetra-brom indigo, but is distinguished by the fact that it dyes unmordanted cotton from its alkaline vat in more reddish blue shades which possess besides an excellent fastness to washing and chlorin a surprising capacity of resistance to the action of light.

The manufacture of this new bromochlor derivative of indigo is illustrated by the following example. 10 parts of trichlor indigo are suspended in 100-120 parts of nitrobenzene and mixed with 6 parts of bromin and the whole is heated in the course of about 1½ hours in a reflux apparatus in an oil bath to a temperature of 220-230° C., this being the temperature of the bath. The temperature is maintained at 220-230° C. for about 1½ hours, during which time much hydrogen bromid is evolved. After cooling and filtering, the solid matter is washed with alcohol and dried. The thus obtained monobrom-trichlor indigo forms small violet-brown crystals having a coppery luster. It dissolves in concentrated sulfuric acid to a pure blue solution and in fuming sulfuric acid to a greenish blue solution. Anilin dissolves it with difficulty when cold and comparatively easily when hot to a pure blue solution, while the solution in nitro-benzene shows a bluish violet coloration. When treated with the usual alkaline reducing agents in a vat, particularly with caustic soda lye and sodium hydrosulfite, the dyestuff yields a clear yellow liquor dyeing cotton bright reddish blue tints fast to washing, light and chlorin.

Instead of nitrobenzene, there may be employed another suitable indifferent diluent or medium.

What I claim is:

1. The herein described process for the manufacture of monobrom-trichlor indigo, which process consists in treating trichlor indigo with bromin in the presence of a suitable indifferent medium.

2. As a new product the herein described monobrom-trichlor indigo, constituting in dry state violet-brown crystals having a coppery luster, being difficultly soluble in cold anilin, more easily in hot anilin with a pure blue color, soluble in nitrobenzene with a bluish violet coloration, dissolving in concentrated sulfuric acid with a pure blue color and in fuming sulfuric acid with a greenish blue color, yielding a yellowish vat by treatment with suitable reducing agents, from which vat unmordanted cotton is dyed in bright reddish blue shades, fast to washing, light and chlorin.

In witness whereof, I have hereunto signed my name in the presence of two subscribing witnesses.

GADIENT ENGI.

Witnesses:
  GEO. GIFFORD
  AMAND RITTER.